United States Patent
Tang et al.

(10) Patent No.: US 8,938,448 B2
(45) Date of Patent: Jan. 20, 2015

(54) ALTERNATIVE MARKET SEARCH RESULT TOGGLE

(75) Inventors: Quan Tang, Beijing (CN); Kun Jing, Beijing (CN); Yaping Liu, Beijing (CN); Winny K. So, Beijing (CN); Mengtong Yang, Redmond, WA (US); Pengyang Xu, Beijing (CN)

(73) Assignee: Microsoft Technology Licensing LLC, Redmond, WA (US)

( * ) Notice: Subject to any disclaimer, the term of this patent is extended or adjusted under 35 U.S.C. 154(b) by 104 days.

(21) Appl. No.: 13/331,942

(22) Filed: Dec. 20, 2011

(65) Prior Publication Data

US 2012/0278309 A1 Nov. 1, 2012

(51) Int. Cl.
*G06F 17/30* (2006.01)

(52) U.S. Cl.
CPC .............................. *G06F 17/30864* (2013.01)
USPC .......................................... 707/722; 707/760

(58) Field of Classification Search
CPC ..................... G06F 17/30669; G06F 17/30427
USPC .................................................. 707/722, 760
See application file for complete search history.

(56) References Cited

U.S. PATENT DOCUMENTS

| | | | |
|---|---|---|---|
| 7,720,856 B2 * | 5/2010 | Goedecke et al. | 707/759 |
| 8,027,966 B2 * | 9/2011 | Drissi et al. | 707/706 |
| 8,332,421 B2 * | 12/2012 | Grossmann | 707/760 |
| 8,577,909 B1 * | 11/2013 | Hodge et al. | 707/760 |
| 8,600,993 B1 * | 12/2013 | Gupta et al. | 707/737 |
| 8,799,307 B2 * | 8/2014 | Chin et al. | 707/760 |
| 2004/0194099 A1 * | 9/2004 | Lamping et al. | 718/100 |
| 2008/0005071 A1 * | 1/2008 | Flake et al. | 707/707 |
| 2008/0097966 A1 * | 4/2008 | Choi et al. | 707/707 |
| 2008/0222140 A1 * | 9/2008 | Lagad et al. | 707/5 |
| 2008/0288474 A1 * | 11/2008 | Chin et al. | 707/707 |
| 2009/0055392 A1 * | 2/2009 | Gupta et al. | 707/5 |
| 2009/0055492 A1 * | 2/2009 | Hubbs et al. | 709/206 |
| 2009/0125497 A1 * | 5/2009 | Jiang et al. | 707/707 |
| 2009/0222437 A1 * | 9/2009 | Niu et al. | 707/707 |
| 2009/0307198 A1 * | 12/2009 | Zhang et al. | 707/707 |
| 2010/0131501 A1 * | 5/2010 | Deeming et al. | 707/724 |
| 2012/0233196 A1 * | 9/2012 | Wu et al. | 707/760 |

(Continued)

OTHER PUBLICATIONS

International Search Report with Written Opinion mailed Feb. 16, 2012 in Application No. PCT/CN2011/073436, 6 pages.

(Continued)

*Primary Examiner* — Robert Beausoliel, Jr.
*Assistant Examiner* — Alexandria Bromell
(74) *Attorney, Agent, or Firm* — Dave Ream; Alin Corie; Micky Minhas (57) ABSTRACT

Systems, methods, and computer media for providing alternative market search results are provided. A user search query in a first market is received. Search results relevant to the user search query are identified for the first market in a first language. A user intent to receive search results for the user search query for a second market and in a second language is determined. A search results page is presented that includes headings and search results for the first market in the first language as well as a search result toggle that includes a user-selectable option to present alternative search results for a second market in a second language. Selection of the option to present alternative search results causes search results for the second market and in the second language to be presented in the search results page along with the search results page headings in the first language.

20 Claims, 8 Drawing Sheets

(56) References Cited

U.S. PATENT DOCUMENTS

2012/0317090 A1* 12/2012 Bennett .................. 707/709
2013/0031122 A1* 1/2013 Riezler et al. ............. 707/760

OTHER PUBLICATIONS

Chen, et al., "Efficient Query Processing in Geographic Web Search Engines", In Proceedings of the 2006 ACM SIGMOD international conference on Management of data, Jun. 27-29, 2006, 12 pages.

Cambazoglu, et al., "Architecture of a Grid-Enabled Web Search Engine", In Journal Information Processing and Management: an International Journal, vol. 43, Issue 3, May 3, 2007, 15 pages.

Zhau, et al., "Hybrid Index Structures for Location-Based Web Search", In Proceedings of the 14th ACM international conference on Information and knowledge management, Oct. 31-Nov. 5, 2005, 8 pages.

Jones, et al., "Spatial Information Retrieval and Geographical Ontologies an Overview of the SPIRIT Project", In Proceedings of the 25th annual international ACM SIGIR conference on Research and development in information retrieval, Aug. 11-15, 2002, 2 pages.

* cited by examiner

ALTERNATIVE MARKET SEARCH RESULT TOGGLE

BACKGROUND

Internet searching has become increasingly common in recent years. Users typically enter a search query having one or more search terms into a search engine web page. A search results page, including search result hyperlinks ranked and arranged in order of relevance, is then presented to the user. Search engines have begun to provide market-specific search results to various locations around the world. For example, for the same user query, a user in China may receive search results different from those received by a user in the United States, Germany, or Japan. A user market may either be automatically determined or in some instances may be selected by the user. Users of conventional search engines are typically provided search results for a selected market on a search results page specifically designed for the selected market.

SUMMARY

Embodiments of the present invention relate to systems, methods, and computer media for providing alternative market search results. Using the systems and methods described herein, a user search query in a first market is received. Search results relevant to the user search query are identified by applying a first search algorithm that identifies relevant search results for the first market in a first language. A user intent to receive search results for the user search query for a second market and in a second language is determined. A search results page is provided that includes a plurality of the search results determined to be relevant to the user search query for the first market. The plurality of search results are in the first language. The search results page also includes search results page headings in the first language and a search result toggle that includes a user-selectable option to present alternative search results for the user search query. The alternative search results are determined by applying a second search algorithm that identifies relevant search results for a second market in a second language that is different from the first language. Selection of the option to present alternative search results causes search results for the second market and in the second language to be presented in the search results page along with the search results page headings in the first language.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The present invention is described in detail below with reference to the attached drawing figures, wherein.

DETAILED DESCRIPTION

Embodiments of the present invention are described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" or "module" etc. might be used herein to connote different components of methods or systems employed, the terms should not be interpreted as implying any particular order among or between various steps herein disclosed unless and except when the order of individual steps is explicitly described.

Embodiments of the present invention relate to systems, methods, and computer media for providing alternative market search results. In accordance with embodiments of the present invention, a user in a first market is provided a search results page that includes a user-selectable alternative search results toggle that allows the user to have search results for a second market and in a second language displayed instead of search results for a first market and in a first language.

As discussed above, conventional search engines typically provide different results for different markets. The market may be user selected or is automatically determined based on, for example, a user's IP address or the location of the server that receives the user's query. Market-specific results can provide more relevant information than general results, but users have limited control over market selection. When users are able to select a market, the search results page in which the results for the selected market are returned is specific to the selected market. Thus, a user who receives search results for a first market and subsequently changes the market selection to a second market is provided with search results in a search results page specific to the second market.

Inclusion of a search result toggle in the search results page provides the user control over the type of results that are presented while maintaining the context, layout, headings, and other aspects of the search result page when the selected market is changed. A user in a first market enters a keyword search query, and the system identifies relevant search results for the first market and in a first language by applying an algorithm specific to the first market. The system also determines whether the user has an intent to receive search results for a second market and in a second language. If the user does not have an intent to receive results for the second market, the system provides a conventional search results page. The conventional search results page includes headings in the first language along with search results for the first market and in the first language. If, however, the system determines that a user does have intent to receive results for the second market and in the second language, a search result toggle is included in the provided search results page.

The search result toggle includes a user-selectable option to present alternative search results for the user search query. The alternative search results are for the second market and in the second language. Because the second market is different from the first market, a different algorithm is used to identify relevant results. The search results page provided to the user includes the search results toggle; headings in the first language; and search results for the first market and in the first language. When the user selects the option from the toggle to view the alternative search results, the search results for the first market and in the first language are replaced with search results for the second market and in the second language while retaining the headings and other information in the first language.

In one embodiment of the present invention, a user search query in a first market is received. Search results relevant to the user search query are identified by applying a first search algorithm that identifies relevant search results for the first market in a first language. A user intent to receive search results for the user search query for a second market and in a second language is determined. A search results page is provided that includes a plurality of the search results determined to be relevant to the user search query for the first market, the plurality of search results being in the first language. The search results page also includes search results page headings in the first language. The search results page further includes a search result toggle that includes a user-selectable option to present alternative search results for the user search query. The alternative search results are determined by applying a second search algorithm that identifies relevant search results for a second market in a second language that is different from the first language. The selection of the option to present alternative search results causes search results for the second market and in the second language to be presented in the search results page along with the search results page headings in the first language.

In another embodiment, an intake component receives a user search query in a first market and receives subsequent user selections. A search component identifies search results relevant to the user search query by applying at least one of a first search algorithm that identifies relevant search results for the first market in a first language and a second search algorithm that identifies relevant search results for a second market in a second language. A classifier determines a user intent to receive search results for the user search query for the second market in the second language. An integration component, upon determining that the intent of the user search query is for search results for the second market in the second language, provides a search results page including search results determined by the search component to be relevant to the user search query for the first market, the search results being in the first language. The provided search results page also includes search results page headings in the first language. The provided search results page further includes a search result toggle that includes a user-selectable option to present alternative search results for the user search query. The alternative search results are determined by applying the second search algorithm. Selection of the option to present alternative search results causes search results for the second market and in the second language to be presented in the search results page along with the search results page headings in the first language.

In still another embodiment, a user search query in a local market is received. Search results relevant to the user search query are identified by applying a local search algorithm that identifies relevant search results for the local market in a local language. A user intent to receive search results for the user search query for an international market and in the English language is determined by running a classifier on the received user search query and identifying a user intent to receive search results for the international market when the results of the classifier are above a threshold. The international market is different from the local market. A search results page is provided in a local mode, the local mode including a plurality of the search results determined to be relevant to a current user search query for the local market. The plurality of search results are in the local language. The local mode also includes search results page headings in the local language. The local mode further includes a search result toggle that includes a user-selectable option to present search results in either the local mode or an international mode. The international mode includes a plurality of search results in the English language determined to be relevant to the current user search query for the international market by applying an international search algorithm. The international mode also includes search results page headings in the local language and the search result toggle.

Figure 1:
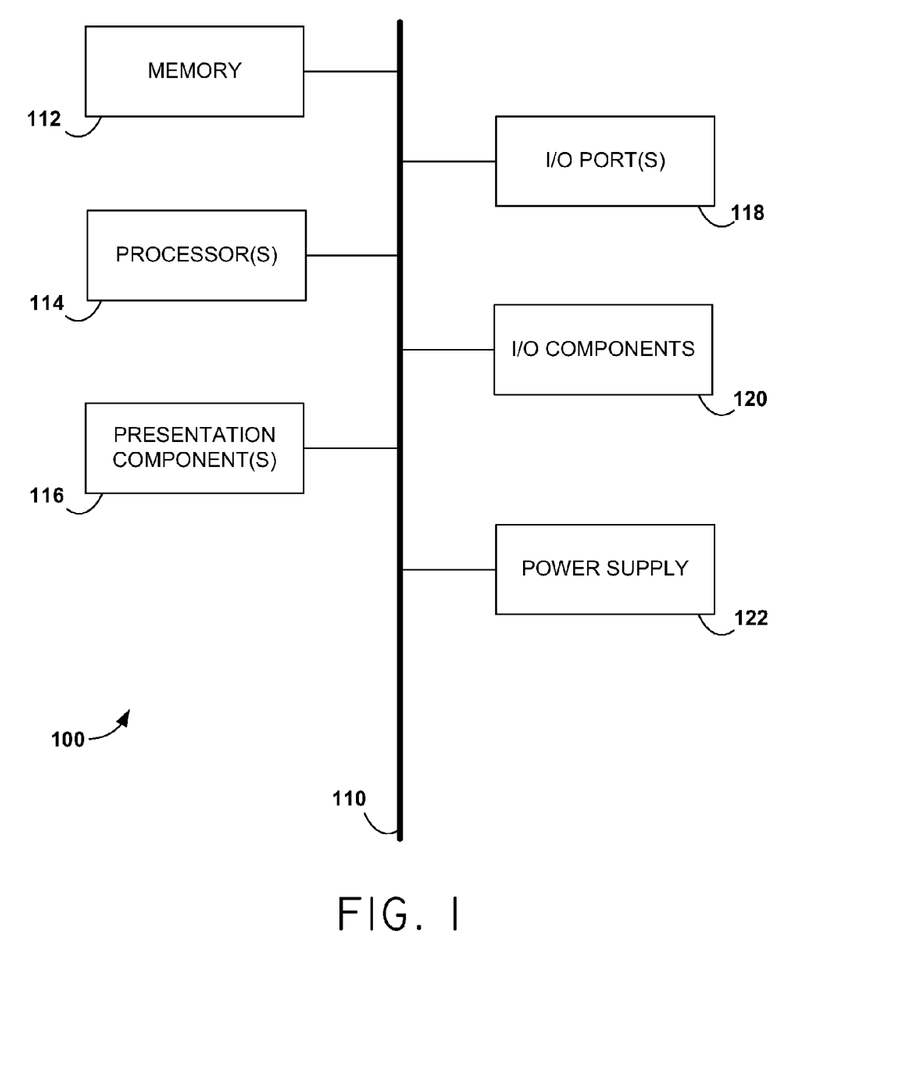
FIG. 1 is a block diagram of an exemplary computing environment suitable for use in implementing embodiments of the present invention.

Having briefly described an overview of some embodiments of the present invention, an exemplary operating environment in which embodiments of the present invention may be implemented is described below in order to provide a general context for various aspects of the present invention. Referring initially to FIG. 1 in particular, an exemplary operating environment for implementing embodiments of the present invention is shown and designated generally as computing device 100. Computing device 100 is but one example of a suitable computing environment and is not intended to suggest any limitation as to the scope of use or functionality of embodiments of the present invention. Neither should the computing device 100 be interpreted as having any dependency or requirement relating to any one or combination of components illustrated.

Embodiments of the present invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. Embodiments of the present invention may be practiced in a variety of system configurations, including hand-held devices, consumer electronics, general-purpose computers, more specialty computing devices, etc. Embodiments of the present invention may also be practiced in distributed computing environments where tasks are performed by remote-processing devices that are linked through a communications network.

With reference to FIG. 1, computing device 100 includes a bus 110 that directly or indirectly couples the following devices: memory 112, one or more processors 114, one or more presentation components 116, input/output ports 118, input/output components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. We recognize that such is the nature of the art, and reiterate that the diagram of FIG. 1 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 1 and reference to "computing device."

Computing device 100 typically includes a variety of computer-readable media. Computer-readable media can be any available media that can be accessed by computing device 100 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 100.

Communication media typically embodies computer-readable instructions, data structures, program modules, or other data in a modulated data signal such as a carrier wave. The term "modulated data signal" refers to a propagated signal that has one or more of its characteristics set or changed to encode information in the signal. By way of example, and not limitation, communication media includes wired media, such as a wired network or direct-wired connection, and wireless media such as acoustic, RF, infrared, radio, microwave, spread-spectrum, and other wireless media. Combinations of the above are included within the scope of computer-readable media.

Memory 112 includes computer storage media in the form of volatile and/or nonvolatile memory. The memory may be removable, nonremovable, or a combination thereof. Exemplary hardware devices include solid-state memory, hard drives, optical-disc drives, etc. Computing device 100 includes one or more processors that read data from various entities such as memory 112 or I/O components 120. Presentation component(s) 116 present data indications to a user or other device. Exemplary presentation components include a display device, speaker, printing component, vibrating component, etc.

I/O ports 118 allow computing device 100 to be logically coupled to other devices including I/O components 120, some of which may be built in. Illustrative components include a microphone, joystick, game pad, satellite dish, scanner, printer, wireless device, etc.

Figure 2:
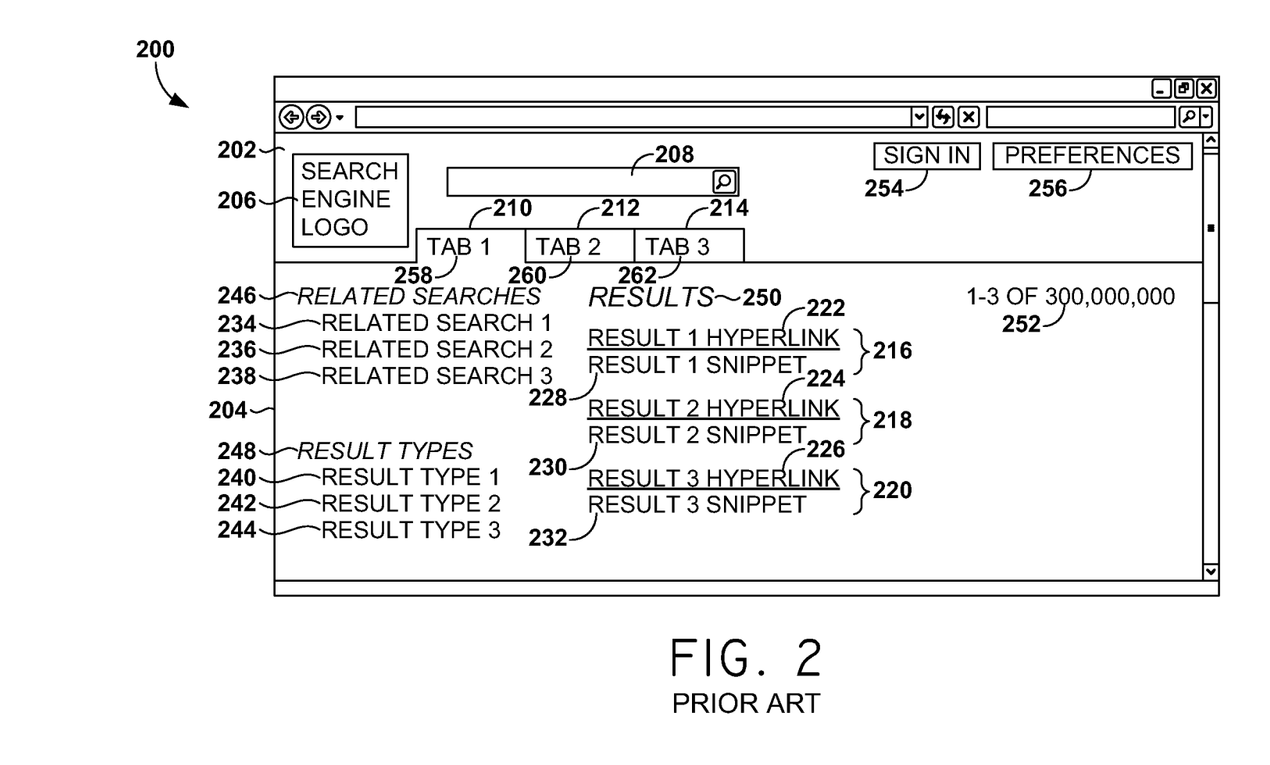
FIG. 2 is a block diagram of a prior art search results page.

As discussed previously, embodiments of the present invention relate to systems, methods, and computer media for providing alternative market search results. FIG. 2 is a block diagram of a prior art search results page. Embodiments of the present invention will be discussed with reference to FIGS. 3-8.

FIG. 2 is a block diagram illustrating a typical prior art search results page 200. Search results page 200 includes header 202 and body 204. Header 202 includes search engine logo 206 and keyword entry area 208. Body 204 includes tabs 210, 212, and 214, which allow a user to select different document types or otherwise refine returned search results. Body 204 includes search results 216, 218, and 220. Search results 216, 218, and 220 include result hyperlinks 222, 224, and 226 as well as result snippets 228, 230, and 232. Body 204 also includes suggested related searches 234, 236, and 238 and result types 240, 242, and 244, which allow a user to select different result types such as audio results, video results, text results, etc. Body 204 also includes headings 246, 248, 250, 252, 254, 256, 258, 260, and 262.

As used herein, the term "headings" encompasses the text portions of a search results page that are not the search results themselves. "Headings" includes information in the portions of the search results page known as the "header" and "footer" portions as well as information in the body of the results page. Exemplary headings in search results page 200 include user-selectable links such as headings 254 "sign in," 256 "preferences," and tab headings 258, 260, and 262 as well as informative headings such as heading 246 "related searches," 248 "result types," 250 "results," and 252 "1-3 of 300,000,000." Headings may additionally include search engine logo 206 and links to other web sites affiliated with the search provider.

Figure 3:
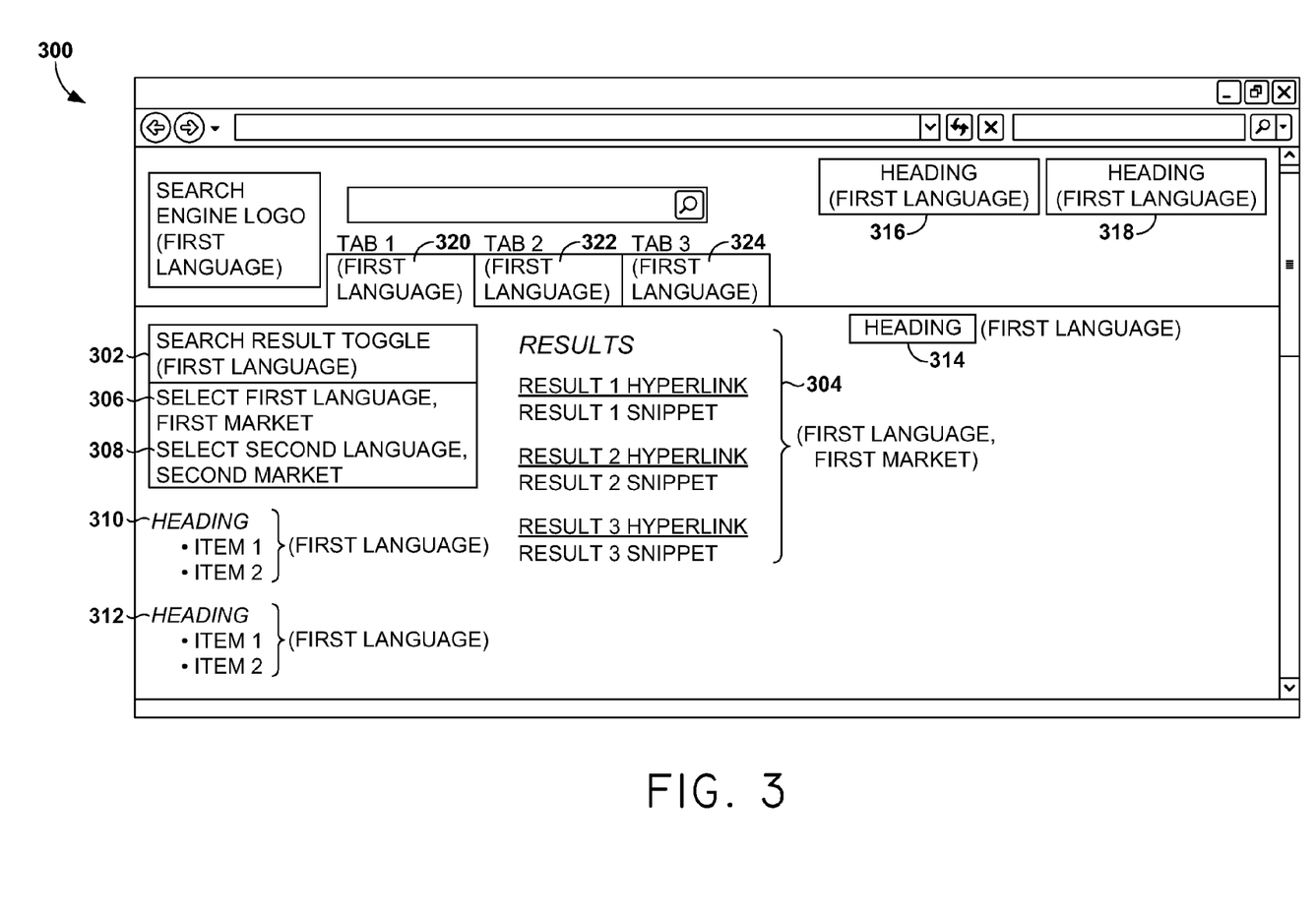
FIG. 3 is a block diagram of a search results page in accordance with an embodiment of the present invention, the search results page including an alternative search result toggle and including results for a first market in a first language.

FIG. 3 illustrates a search results page 300 including an alternative search result toggle 302. Search results page 300 includes search results 304 for a first market and in a first language that are identified as a result of a user keyword search query. Headings 310, 312, 314, 316, 318, 320, 322, and 324 are also in the first language. Search result toggle 302 includes a user-selectable option 306 to present search results for the first market and in the first language and a user-selectable option 308 to present search results for a second market and in a second language. In some embodiments search result toggle 302 is presented in every search results page. In other embodiments, search result toggle 302 is presented when it is determined that a user has an intent to receive search results for the second market and in the second language. Intent may be determined by running a classifier and determining intent when the results exceed a pre-determined threshold.

The placement of search result toggle 302 on search results page 300 is simply an exemplary location. Search result toggle 302 can be graphically configured and located in a number of ways. In some embodiments, search result toggle 302 includes only a link to select results that are alternative to the type of results presented. For example, in FIG. 3, search results 304 are for a first market and in a first language. In such embodiments, then, search result toggle 302 would include only user-selectable option 308 to display results for the alternative market—the second market and in the second language. In other embodiments, a heading is not associated with search result toggle 302. Search result toggle 302 may simply be one or more links reading, for example, "alternative market results," "alternative results," "English results," "international results," "local results," "international mode," or "local mode."

Figure 4:
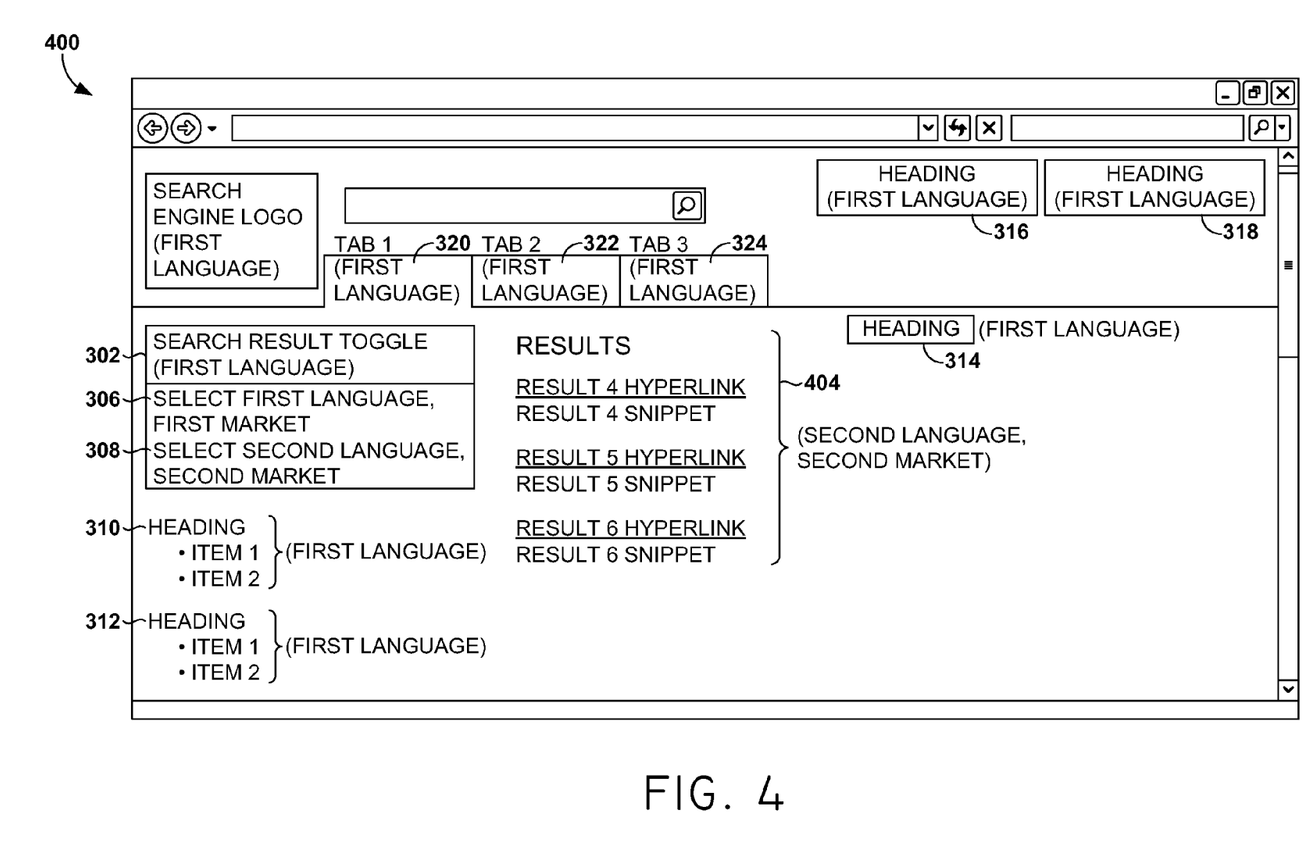
FIG. 4 is a block diagram of a search results page in accordance with an embodiment of the present invention, the search results page including an alternative search result toggle and including results for a second market in a second language.

A user selection of option 308 causes search results page 300 to present results for the second market and in the second language, as illustrated in FIG. 4. Results 304 may either be replaced with new results, or search results page 300 may refresh and redisplay with new results for the second market and in the second language. FIG. 4 illustrates search results page 400 that is presented after a user has selected option 308 to receive search results for the second market and in the second language. Accordingly, search results page 400 includes search results 404 for the second market and in the second language. Headings 310, 312, 314, 316, 318, 320, 322, and 324 continue to be displayed in the first language. Thus, while the presented search results in search results page 400 are for a different market than those originally presented in search results page 300, the user's search environment has not changed and continues to be displayed in the first language. In various embodiments, some headings may also be displayed in the second language or in both the first language and the second language.

In one particular embodiment, the first language is a Chinese language, the first market is either China or an area in China, the second language is English, and the second market is either an international market or a United States market. The keyword search is received for the first market (Chinese market), but the search query does not necessarily have to be in a Chinese language. The keyword search query may also be an English or other language term or terms. Thus, in this embodiment, headings 310, 312, 314, 316, 318, 320, 322, and 324 are displayed in a Chinese language, and search results 304 in FIG. 3 are results for a Chinese market in a Chinese language. When option 308 is selected in this embodiment, search results page 400 in FIG. 4 is provided and includes search results 404 for an International market in the English language along with headings 310, 312, 314, 316, 318, 320, 322, and 324 displayed in a Chinese language. Thus, a user in a Chinese market is able to view English results for an International market while keeping the search environment in a Chinese language.

As discussed above, in some embodiments, user-selectable options 306 and 308 read "local mode" and "international mode," respectively. A search results page in "local mode" is a results page for which the user search query was entered in a local market and search results are provided for the local market and in the local language. In some embodiments, the local mode includes: a plurality of search results determined to be relevant to a current user search query for the local market by applying a local search algorithm, the plurality of search results being in the local language; search results page headings in the local language; and a search result toggle that includes a user-selectable option to present search results in either the local mode or an international mode. In some embodiments, the international mode includes: a plurality of search results in the English language determined to be relevant to the current user search query for an international market by applying an international search algorithm; search results page headings in the local language; and the search result toggle described for the local mode.

The local language may be a language that is commonly spoken by residents of the geographic area from which a received query is submitted. For example, if a query is entered by a user in Berlin, the local language may be German. The local language may also be a dialect or version of a language. For example, if a query is received from a user in London, the local language may be United Kingdom English or a particular London dialect of United Kingdom English. In some embodiments, the local language is a non-English language. It is contemplated that the first and second languages and markets may be any two markets and languages.

Figure 5:
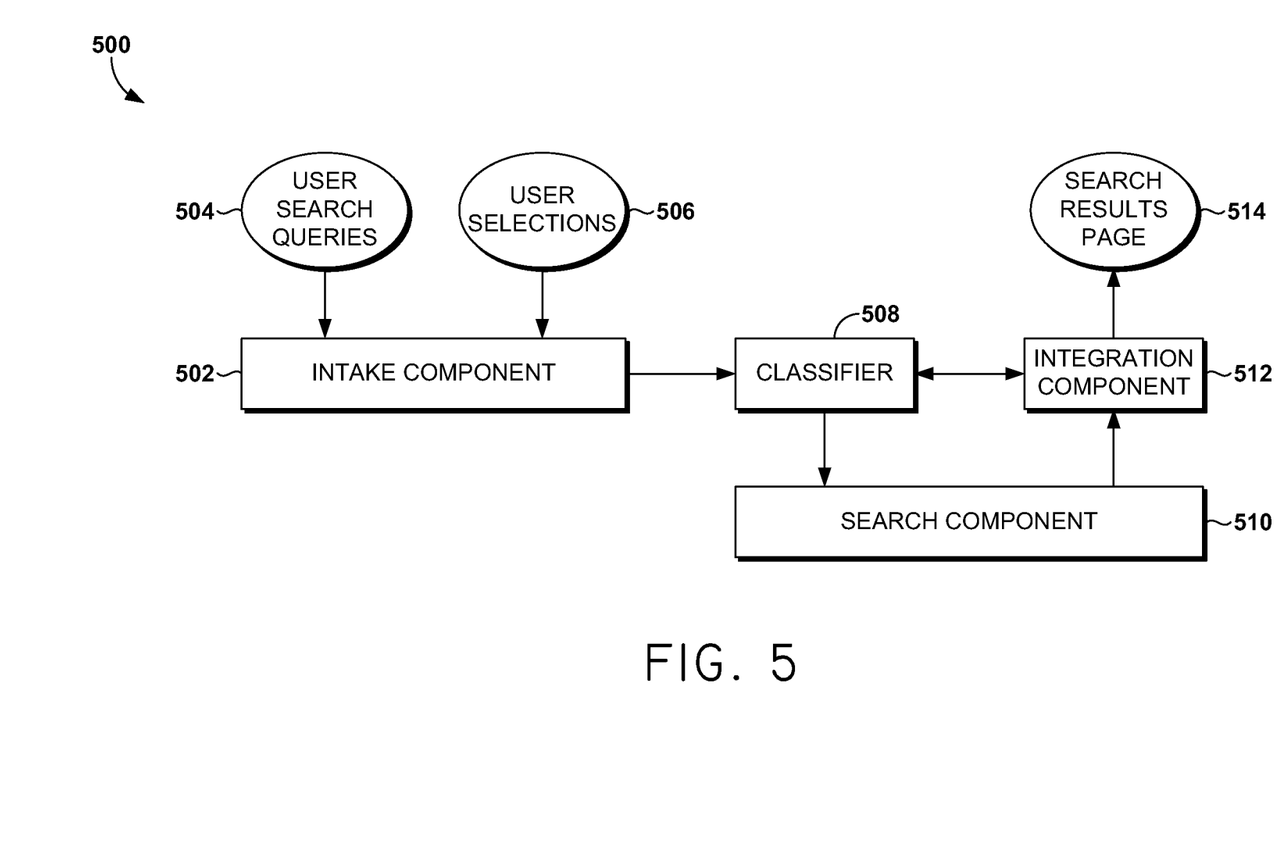
FIG. 5 is a block diagram of an exemplary alternative market search result system in accordance with embodiments of the present invention.

FIG. 5 illustrates an exemplary alternative market search result system 500. Intake component 502 receives both user search queries 504 and subsequent user selections 506 of items on a provided search results page. Classifier 508 analyzes a user search query received in a first market to determine if the user intends to view search results for a second market and in a second language. In some embodiments, classifier 508 determines a user intent to receive search results for the second market in the second language when the results of running the classifier are above a probability threshold. The use and implementation of classifiers is well known in the art and is beyond the scope of this document.

Search component 510 identifies search results relevant to a received user search query by applying at least one of a first search algorithm that identifies relevant search results for the first market in a first language and a second search algorithm that identifies relevant search results for a second market in a second language. As discussed above, it is common for different search algorithms to be implemented for different markets. For example, search component 510 may be passed an indicator by classifier 508 to set a search market to a particular code, number, or name, and search component 510 will apply the corresponding algorithm to identify relevant search results. As used herein, "different search algorithm" includes any difference in the search run by search component 510.

Upon determining that classifier 508 has determined that the intent of the user search query is for search results for the second market in the second language, integration component 512 provides a search results page 514. Search results page 514 includes: search results determined by search component 510 to be relevant to the user search query for the first market, the search results being in the first language; search results page headings in the first language; and a search result toggle that includes a user-selectable option to present alternative search results for the user search query. The alternative search results are determined by applying a second search algorithm. Selection of the option to present alternative search results causes search results for the second market and in the second language to be presented in search results page 514 along with the search results page headings in the first language.

Figure 6:
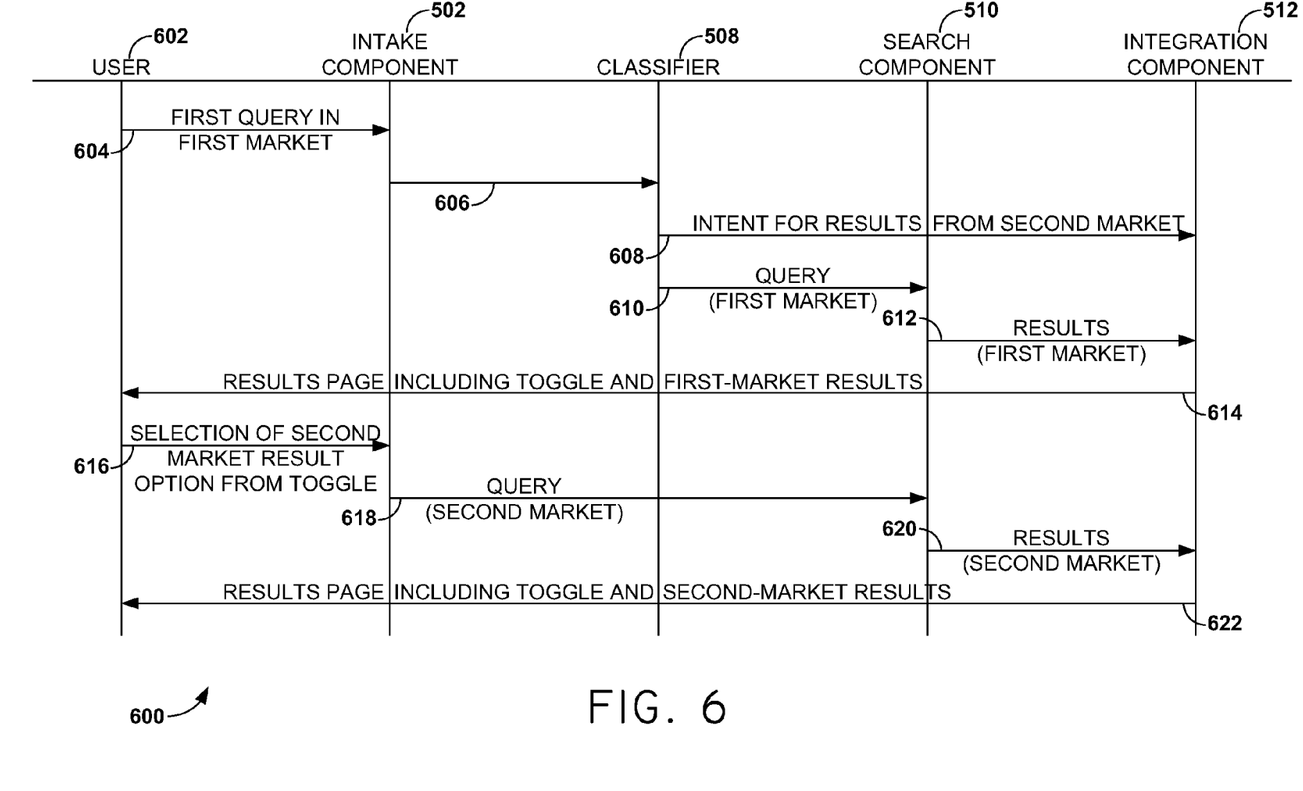
FIG. 6 is a flow chart illustrating an exemplary interaction of the components of the system of FIG. 5 implemented to provide alternative market search results in accordance with embodiments of the present invention.

FIG. 6 is a flow chart more clearly illustrating an exemplary interaction of the components of FIG. 5 and a user 602. In step 604, user 602 submits a first query in a first market, and the query is received by intake component 502. The query is forwarded to classifier 508 in step 606. Classifier 508 determines that the user has an intent to receive results for a second market and in a second language and communicates the intent to integration component 512 in step 608. In step 610, classifier 508 forwards the user search query for the first market to search component 510. An indicator may be included to specify that the query is for the first market. Search component 510 identifies relevant search results for the first market by applying a first search algorithm designed for the first market and communicates the results to integration component 512 in step 612. In step 614, integration component 512 provides a search results page that is presented to user 602, the search results page including headings in the first language, search results for the first market and in the first language, and a search result toggle including a user-selectable option to view alternative search results for a second market and in a second language.

In step 616, a selection by user 602 of the option to view alternative search results for the second market and in the second language is received by intake component 502. Search component 510 is then notified in step 618 to perform a search for the user search query for the second market using a second search algorithm designed for the second market. Search results obtained by applying the second search algorithm are communicated from search component 510 to integration component 512 in step 620. A new or updated search results page that includes the alternative search results toggle, headings in the first language, and search results for the second market and in the second language are then provided by integration component 512 and presented to user 602 in step 622.

Figure 7:
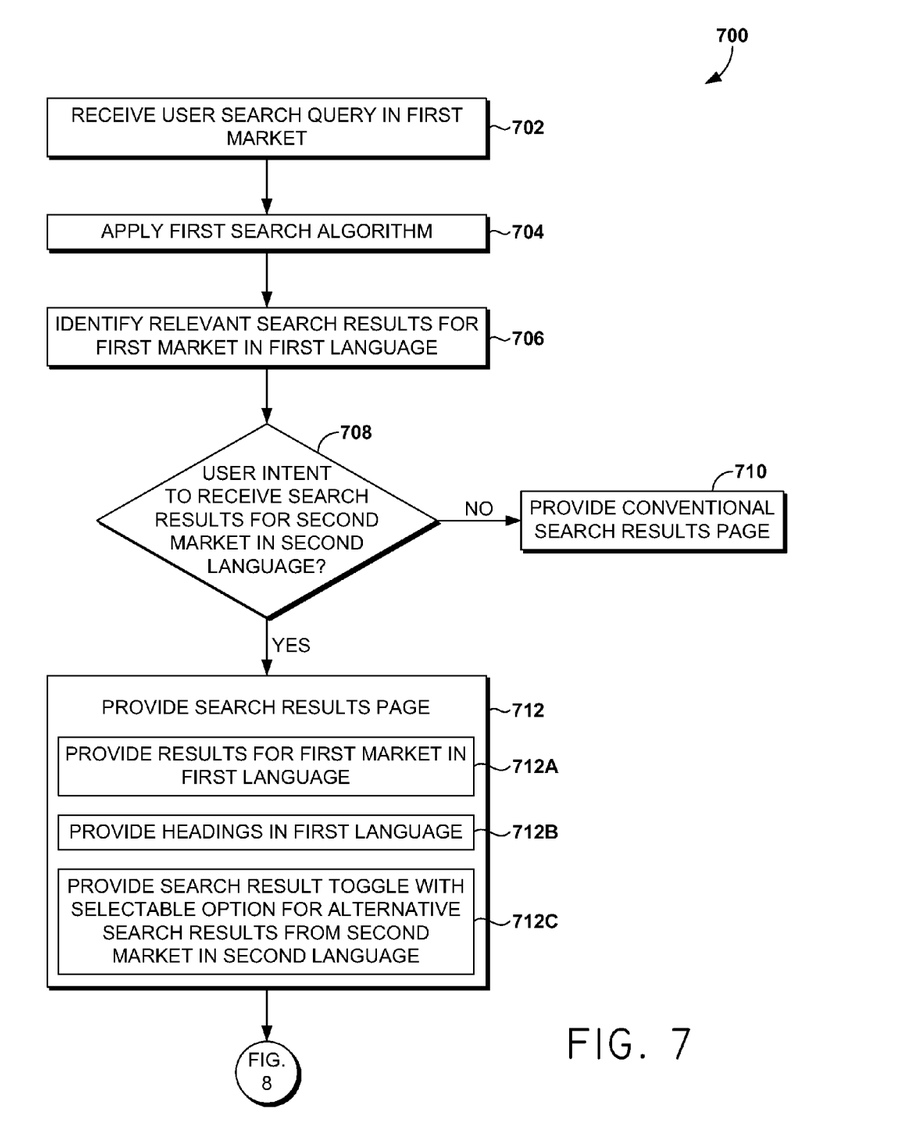
FIG. 7 is a flow chart of an exemplary method for providing alternative market search results in accordance with an embodiment of the present invention.

FIG. 7 is a flow chart illustrating an exemplary method 700 for providing alternative market search results. In step 702, a user search query is received in a first market. In step 704, a first search algorithm is applied, and in step 706, relevant search results for the first market and in the first language are identified as a result of applying the first search algorithm in step 704. In step 708, it is determined if there is a user intent to receive search results for a second market and in a second language. If there is no intent for second-market results, a conventional search results page is provided in step 710. If it is determined that there is a user intent to receive search results for the user search query for a second market and in a second language, then a search results page is provided in step 712.

A number of items are provided that are included in the search results page. In step 712A, a plurality of search results determined to be relevant to the user search query for the first market are provided, the plurality of search results being in the first language. Search results page headings in the first language are provided in step 712B. A search result toggle that includes a user-selectable option to present alternative search results for the user search query is provided in step 712C. The alternative search results are determined by applying a second search algorithm that identifies relevant search results for a second market in a second language that is different from the first language. Selection of the option to present alternative search results causes search results for the second market and in the second language to be presented in the search results page along with the search results page headings in the first language.

Figure 8:
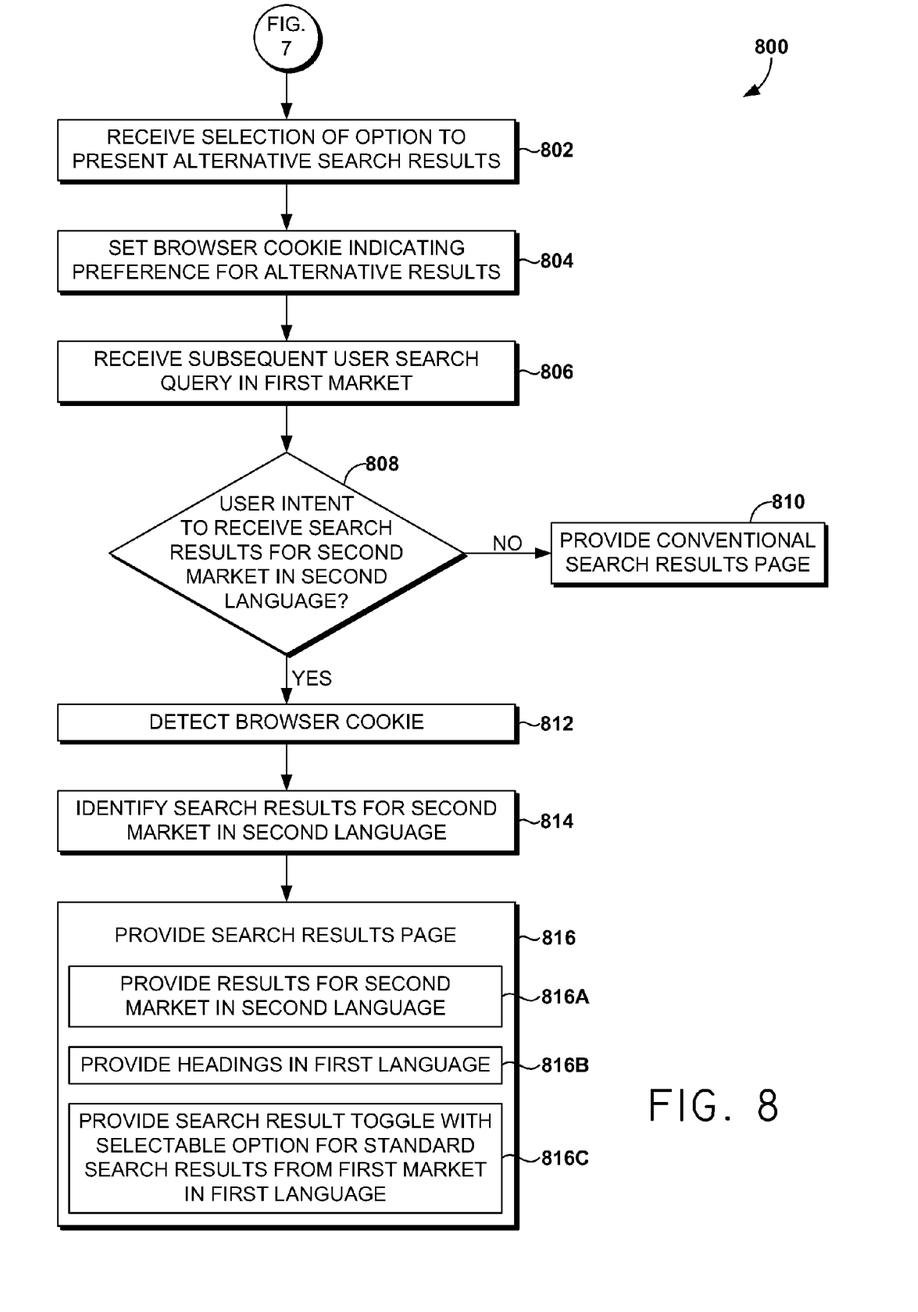
FIG. 8 is a flow chart of an exemplary method for providing alternative market search results in accordance with an embodiment of the present invention in which a browser cookie is set with a preference for alternative market results.

FIG. 8 illustrates a flow chart illustrates an exemplary method 800 for providing alternative market search results in accordance with an embodiment of the present invention in which a browser cookie is set with a preference for alternative market results. Method 800 may proceed after the steps of method 700 in FIG. 7. In step 802, a user selection of the option in the search result toggle to present alternative search results is received. A browser cookie indicating a preference for alternative search results is then set in step 804.

In step 806, a second user search query in the first market is received. As with step 708 in FIG. 7, in step 808 it is determined if there is a user intent to receive search results for the second user search query for the second market in the second language. If no such intent is determined, a conventional search results page is provided in step 810. If, however, an intent to receive search results for the second market and in the second language is determined, then the browser cookie indicating a preference for alternative search results set in step 804 is detected in step 812. In step 814, search results relevant to the second user search query are identified by applying the second search algorithm that identifies relevant search results for the second market in the second language.

A search results page is provided in step 816. The provided page may be an update to a previously provided search results page or may be a new search results page. As with step 712 in FIG. 7, a number of items comprising the search result page are provided in step 816. In step 816A, a plurality of the search results determined to be relevant to the second user search query are provided, the plurality of search results being for the second market and in the second language. In step 816B, search results page headings in the first language are provided. In step 816C, the search result toggle that includes a user-selectable option to present standard search results for the second user search query is provided. The standard search results are determined by applying the first search algorithm that identifies relevant search results for the first market in the first language. Selection of the option to present standard search results causes search results for the first market and in the first language to be presented in the second search results page along with the search results page headings in the first language.

FIG. 8 illustrates the effect of setting and subsequently detecting a browser cookie indicating a preference for alternative search results. In the method of FIG. 7, when a user intent to receive alternative results is determined, a search result toggle is presented in the search results page along with search results for the first market. The user can select alternative results for the second market, but first-market results are presented. When a cookie is detected, in contrast, the search result toggle with user-selectable options is still included in the search results page, but second-market results are presented to the user rather than first-market results. Detection of the browser cookie in step 812, among other steps, may occur in a different order that that shown in FIGS. 7 and 8.

Although the illustration and discussion of the alternative search results toggle in this document has focused on providing search results for two alternative markets, it is contemplated that particular embodiments may include three or more user-selectable options for different markets and corresponding languages.

The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and sub-combinations are of utility and may be employed without reference to other features and sub-combinations. This is contemplated by and is within the scope of the claims.

Having thus described the invention, what is claimed is:
1. At least one computer-storage device storing computer-executable instructions for performing a method for providing alternative market search results, the method comprising:
receiving a user search query in a first market;
identifying search results relevant to the user search query by applying a first search algorithm associated with the first market that identifies relevant search results for the first market in a first language;
determining a user intent to receive search results for the user search query for a second market; and
providing a first search results page including:
  a) a first plurality of the search results determined to be relevant to the user search query for the first market, the plurality of search results being in the first language,
  b) a search results page headings in the first language, and
  c) a search results toggle that includes a user-selectable option to present alternative search results for the second market;
upon selection by the user to present alternative search results for the second market, determining alternative search results for the second market in a second language by applying a second search algorithm associated with the second market that identifies relevant search results for the second market in the second language, wherein the second market associated with the second language is different from the first market associated with the first language;

in a second search results page, retaining the headings in the first language and replacing the first plurality of search results with a second plurality of search results, wherein the second plurality of search results are the alternative search results identified for the second market in the second language, the second plurality of search results retrieved by using the second search algorithm associated with the second market;

presenting the second search results page with the second plurality of search results to the user.

2. The device of claim 1, wherein determining the user intent comprises:

running a classifier on the received user search query, and identifying a user intent to receive search results for the second market in the second language when the results of the classifier are above a threshold.

3. The device of claim 1, wherein the first language is a language commonly spoken in the first market.

4. The device of claim 3, wherein the first language is a Chinese language.

5. The device of claim 1, wherein the second language is English.

6. The device of claim 1, further comprising upon receiving a user selection of the option to present alternative search results, setting a browser cookie indicating a preference for alternative search results.

7. The device of claim 6, further comprising:

receiving a second user search query;

determining a user intent to receive search results for the second user search query for the second market in the second language;

detecting the browser cookie indicating the preference for alternative search results;

identifying search results relevant to the second user search query by applying the second search algorithm that identifies relevant search results for the second market in the second language; and providing a third search results page including:

d) a third plurality of the search results determined to be relevant to the second user search query, the third plurality of search results being for the second market and in the second language, e) search results page headings in the first language, and f) the search result toggle that includes a user-selectable option to present standard search results for the second user search query, wherein the standard search results are determined by applying the first search algorithm that identifies relevant search results for the first market in the first language, and wherein selection of the option to present standard search results causes search results for the first market and in the first language to be presented in the third search results page along with the search results page headings in the first language.

8. A computer device implemented method for providing alternative market search results, the method comprising:

receiving a user search query in a first market;

identifying search results relevant to the user search query by applying at least one of a first search algorithm associated with a first market that identifies relevant search results for the first market in a first language and a second search algorithm associated with a second market that identifies relevant search results for the second market in a second language;

determining a user intent to receive search results for the user search query for the second market; and upon determining that the intent of the user search query is for search results for the second market, providing a search results page including:

a first plurality of search results determined by the search component to be relevant to the user search query for the first market, the search results being in the first language, search results page native headings in the first language, and a search result toggle that includes a user-selectable option to present alternative search results for the second market for the user search query, wherein the alternative search results are determined by applying the second search algorithm associated with the second market, and wherein selection of the option to present alternative search results causes the first plurality of search results to be replaced by a second plurality of search results for the second market in the second language, and to present in the search results page, the second plurality of search results while retaining the native headings in the first language.

9. The method of claim 8, wherein the classifier determines a user intent to receive search results for the second market in the second language when the results of the classifier are above a threshold.

10. The method of claim 8, wherein the first language is a language commonly spoken in the first market.

11. The method of claim 10, wherein the first language is a Chinese language.

12. The method of claim 8, wherein the second language is English.

13. The method of claim 8, wherein upon receiving a user selection of the option to present alternative search results, setting a browser cookie indicating a preference for alternative search results.

14. The method of claim 13, wherein upon detection of the browser cookie indicating the preference for alternative search results, in a search results page provided for a subsequent user search query:

the provided second plurality of search results are determined by applying the second search algorithm and are for the second market, the search results page headings are in the first language, and the search result toggle includes a user-selectable option to present standard search results for the subsequent user search query, wherein the standard search results are determined by applying the first search algorithm that identifies relevant search results for the first market in the first language, and wherein selection of the option to present standard search results causes search results for the first market and in the first language to be presented in the search results page for the subsequent user query along with the search results page headings in the first language.

15. At least one computing device storing computer-executable instructions for performing a method for providing alternative market search results, the method comprising:

receiving a user search query in a local market;

identifying search results relevant to the user search query by applying a local search algorithm that identifies relevant search results for the local market in a local language;

determining a user intent to receive search results for the user search query for an international market and in the English language by running a classifier on the received user search query and identifying a user intent to receive search results for the international market when the results of the classifier are above a threshold, the international market being different from the local market; and providing a search results page in a local mode, the local mode including:

a first plurality of the search results determined to be relevant to a current user search query for the local market, the plurality of search results being in the local language, a search results page headings in the local language, and a search result toggle that includes a user-selectable option to identify search results and present search results in either the local mode or an international mode, wherein the international mode includes an international search algorithm used in the international market, and upon selection of the international mode, replacing the first plurality of search results with a second plurality of search results determined to be relevant to the current user search query for the international market by using the international search algorithm.

16. The device of claim 15, wherein the local language is a language commonly spoken in the local market.

17. The device of claim 15, wherein the local language is a Chinese language.

18. The device of claim 15, wherein the local language is a non-English language.

19. The device of claim 15, further comprising upon receiving a user selection of the option to present search results in the international mode, setting a browser cookie indicating a preference for the international mode.

20. The device of claim 19, further comprising:

receiving a second user search query;

determining a second user intent to receive search results for the second user search query for the international market in the English language;

detecting the browser cookie indicating the preference for the international mode;

identifying search results relevant to the second user search query by applying the international search algorithm that identifies relevant search results for the international market in the English language; and providing a second search results page in the international mode, where the current user search query is the second user search query.

* * * * *